US012167151B2

(12) United States Patent
Das et al.

(10) Patent No.: US 12,167,151 B2
(45) Date of Patent: Dec. 10, 2024

(54) SYSTEM AND METHOD FOR IMAGING AN OBJECT

(71) Applicant: Techcomb Inc., Irving, TX (US)

(72) Inventors: Choudhry Aditya Narayan Das, Irving, TX (US); Jonathan Kretz, Irving, TX (US)

(73) Assignee: TECHCOMB INC., Irving, TX (US)

(*) Notice: Subject to any disclaimer, the term of this patent is extended or adjusted under 35 U.S.C. 154(b) by 150 days.

(21) Appl. No.: 18/095,492

(22) Filed: Jan. 10, 2023

(65) Prior Publication Data

US 2024/0236511 A1 Jul. 11, 2024

(51) Int. Cl.
| | |
|---|---|
| H04N 23/90 | (2023.01) |
| G06T 3/16 | (2024.01) |
| G06T 7/80 | (2017.01) |
| H04N 23/51 | (2023.01) |
| H04N 23/54 | (2023.01) |
| H04N 23/66 | (2023.01) |

(52) U.S. Cl.
CPC ............... *H04N 23/90* (2023.01); *G06T 3/16* (2024.01); *G06T 7/80* (2017.01); *H04N 23/51* (2023.01); *H04N 23/54* (2023.01); *H04N 23/66* (2023.01)

(58) Field of Classification Search
CPC ........ H04N 23/50; H04N 23/51; H04N 23/54; H04N 23/57; H04N 23/66; H04N 23/90; G06T 3/16; G06T 7/55; G06T 7/80; G03B 17/48
See application file for complete search history.

(56) References Cited

U.S. PATENT DOCUMENTS

| | | | |
|---|---|---|---|
| 5,852,672 A | 12/1998 | Lu | |
| 8,270,668 B2 | 9/2012 | Reinholt et al. | |
| 2013/0202195 A1* | 8/2013 | Perez Cortes | G01B 11/245 |
| | | | 382/154 |
| 2017/0173638 A1* | 6/2017 | Wagner | B07C 5/3412 |
| 2021/0350496 A1 | 11/2021 | Carey et al. | |

FOREIGN PATENT DOCUMENTS

WO 2019238477 A1 12/2019

OTHER PUBLICATIONS

IEEE Publication, 2010 Workshops on Database and Expert Systems Applications, "Demonstrations of computer vision applications" by Salvador et al (Year: 2010).*

* cited by examiner

*Primary Examiner* — Daniel M Pasiewicz
(74) *Attorney, Agent, or Firm* — Lloyd & Mousilli; Benjamin M. Hanrahan

(57) ABSTRACT

A system and method for acquiring an image. The method includes dropping an object into free fall, detecting the dropping of the object, triggering a plurality cameras to simultaneously image the object in parallel, while the object drops into a bottom half of an imaging sphere at a center of a field of view of each of the plurality of cameras, upon detecting the dropping of the object, analyzing images of the imaged object in parallel, based on a trained machine learning model, and displaying a three dimensional image of a surface of the object based on the analysis of the images of the imaged object.

20 Claims, 16 Drawing Sheets

SYSTEM AND METHOD FOR IMAGING AN OBJECT

TECHNICAL FIELD

The present disclosure relates generally to the field of imaging. More specifically, the present disclosure relates to a system and method for facilitating imaging of objects.

BACKGROUND

Imaging a three-dimensional surface, of objects such as a sphere or a cube in its entirety, requires sequential imaging of parts of the surfaces of the objects by rotating the object and then combining those images in a particular pattern to reconstruct the entire surface image or using multiple cameras with overlapping field of view. Even if multiple cameras with overlapping fields of view are used, the object's surface still cannot be imaged in its entirety due to the obstruction created by the mechanical fixture holding the object.

Existing techniques for imaging the three-dimensional surface of the objects have challenges such as latency in the imaging when the objects are imaged using the sequential imaging method and incompleteness in the imaging when the objects are imaged using the multi-camera imaging method.

Therefore, there is a need for improved methods, systems, apparatuses, and devices for facilitating imaging of objects that may overcome one or more of the above-mentioned problems and/or limitations.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include an imaging apparatus. The imaging apparatus includes a frame disposable on at least one surface, and an imaging sphere mounted on the frame. The imaging sphere includes a hollow interior, an inlet opening, and an outlet opening disposed diametrically opposite to the inlet opening. An object dropped into the imaging sphere from the inlet opening exits the imaging sphere through the outlet opening by passing through the imaging sphere, and the passing of the object through the imaging sphere includes free falling through the imaging sphere. The imaging apparatus also includes at least one detector mounted in at least one location on the imaging sphere. The at least one detector is configured for generating at least one trigger signal based on detecting a passing of the object through at least one detecting region of the imaging sphere, and the at least one detecting region corresponds to the at least one location. The imaging apparatus further includes a plurality of imaging sensors supported by the frame for mounting the plurality of imaging sensors in a plurality of locations on the imaging sphere. The plurality of imaging sensors is communicatively coupled with the at least one detector, and the plurality of imaging sensors is configured for: simultaneously imaging the object passing through the imaging sphere from the plurality of locations in parallel, based on the at least one trigger signal; and simultaneously generating a plurality of images of the object passing through at least one imaging region of the imaging sphere based on the simultaneously imaging, wherein the plurality of images corresponds to a plurality of views of the object viewed from the plurality of locations. The imaging apparatus also includes a processing device communicatively coupled with the plurality of imaging sensors, wherein the processing device is configured for analyzing the plurality of images in parallel; and generating an image of the object based on the analyzing. The imaging apparatus further includes a storage device communicatively coupled with the processing device, wherein the storage device is configured for storing the image.

Certain embodiments disclosed herein also include an imaging apparatus. The imaging apparatus includes a frame disposable on at least one surface, and an imaging sphere mounted on the frame. The imaging sphere includes a hollow interior, an inlet opening, and an outlet opening disposed diametrically opposite to the inlet opening. An object dropped into the imaging sphere from the inlet opening exits the imaging sphere through the outlet opening by passing through the imaging sphere. Also, the passing of the object through the imaging sphere further includes free falling through the imaging sphere. The imaging apparatus also includes at least one detector mounted in at least one location on the imaging sphere. The at least one detector is configured for generating at least one trigger signal based on detecting a passing of the object through at least one detecting region of the imaging sphere. Also, the at least one detecting region corresponds to the at least one location. The imaging apparatus further includes a plurality of imaging sensors supported by the frame for mounting the plurality of imaging sensors in a plurality of locations on the imaging sphere. The plurality of imaging sensors is communicatively coupled with the at least one detector. The plurality of imaging sensors is configured for simultaneously imaging the object passing through the imaging sphere from the plurality of locations in parallel, based on the at least one trigger signal, and simultaneously generating a plurality of images of the object passing through at least one imaging region of the imaging sphere based on the simultaneously imaging. The plurality of images corresponds to a plurality of views of the object viewed from the plurality of locations. The imaging apparatus also includes a processing device communicatively coupled with the plurality of imaging sensors. The processing device is configured for analyzing the plurality of images in parallel, and generating an image of the object based on the analyzing. The imaging apparatus further includes a storage device communicatively coupled with the processing device. The storage device is configured for storing the image. The imaging apparatus also includes a feeding tube supported by the frame for vertically mounting the feeding tube on the imaging sphere. The feeding tube includes an inlet, an outlet, and an internal cavity coupling the inlet to the outlet, the outlet is coupled with the inlet opening based on the vertically mounting for coupling the internal cavity with the hollow interior of the imaging sphere, the object is placed in the inlet for dropping the object into the imaging sphere, and the placing of the object in the inlet for the dropping of the object into the imaging sphere does not impart rotation to the object passing through the imaging sphere.

Certain embodiments disclosed herein further include a method for acquiring an image. The method includes dropping an object into free fall, detecting the dropping of the object, triggering a plurality cameras to simultaneously image the object in parallel, while the object drops into a bottom half of an imaging sphere at a center of a field of view of each of the plurality of cameras, upon detecting the dropping of the object, analyzing images of the imaged object in parallel, based on a trained machine learning model, and displaying a three dimensional image of a surface of the object based on the analysis of the images of the imaged object.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
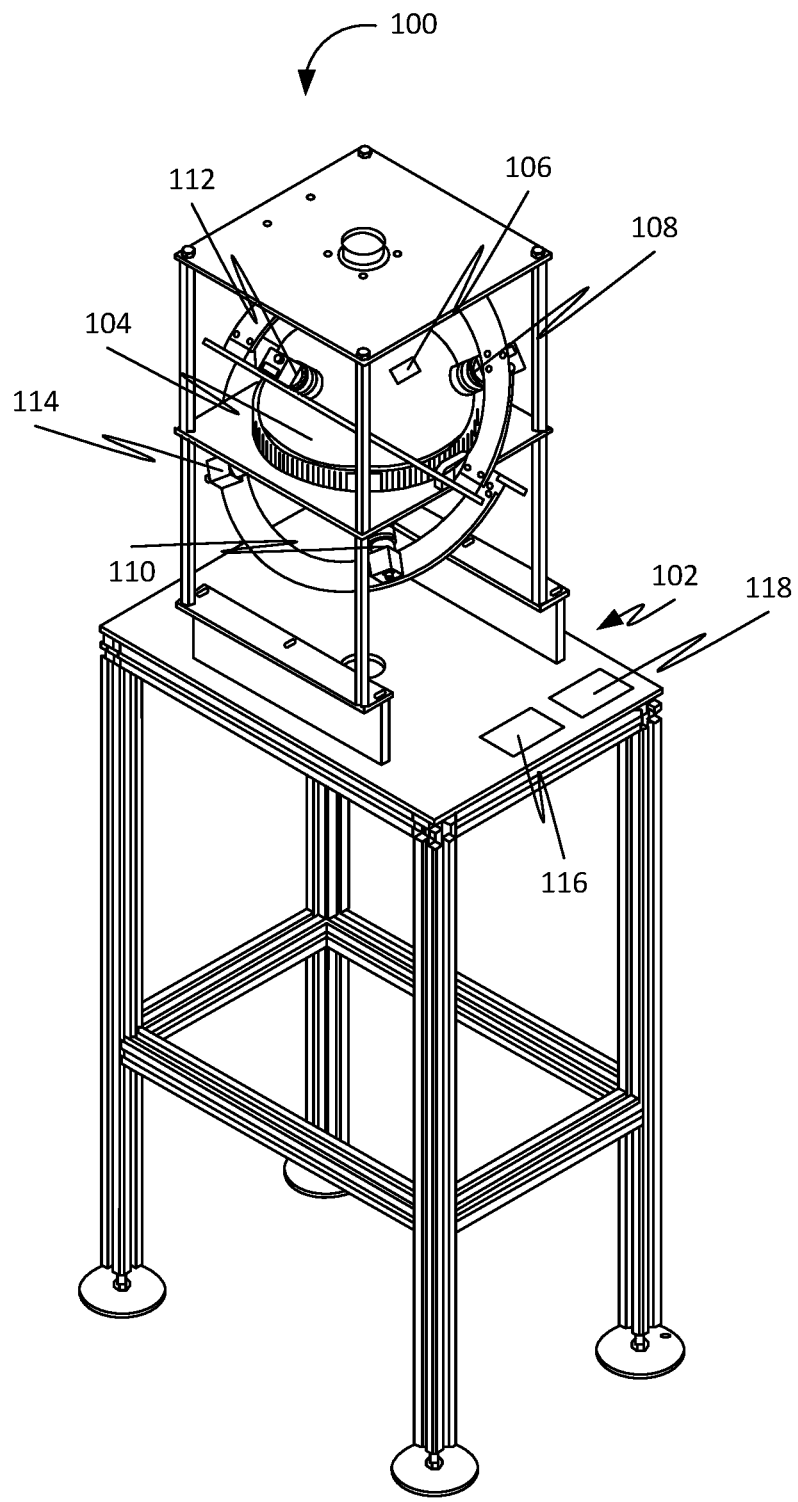
FIG. 1 is a perspective view of an apparatus for facilitating imaging of objects, in accordance with some embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of systems, methods, apparatuses, and devices for facilitating imaging of objects, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the processing device may be a computing device with processing units. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data finger-printing, role based access control, and so on. Further, the storage device may include a memory.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer, etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g., transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, and identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g., initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

The present disclosure describes and discloses a system and method for facilitating imaging of objects.

Further, the disclosed systems may include a gravity-induced, multi-view imaging system for synchronous acquisition (simultaneous imaging) of images of the three-dimensional (3D) surface of a 3D object. Further, the disclosed systems image the entirety of a three-dimensional surface, such as a sphere or a cube. Further, the disclosed systems singulate the objects in a feeder using a mechanical separator. Then drop the object into free fall under gravity and without any other external or internal force. As the falling object passes through a laser detector, a trigger signal is used to synchronously trigger multiple cameras, strategically located around the falling object to image the object at the same time. The trigger delay, acquisition parameters, and object specifications are carefully tuned into the parallel acquisition software module to position the image of the object at the center of the field of view of each camera.

Further, the disclosed systems may include a ball isolation and drop mechanism incorporated in the disclosed systems. Further, balls are fed into the drop mechanism through a feeder tube. There is a fly-wheel or a gear with multiple teeth that rotates upon the trigger to drop the ball. The very last ball in the feeder is essentially caught by one of the teeth in the fly-wheel and the other balls are held back from falling by the following tooth. Sso every quarter rotation of the fly-wheel drops one ball into the imaging sphere. This is assuming that there are four teeth placed at 90 degrees separation in the fly-wheel. This described drop mechanism is currently in operation. Further, the ball isolation and drop mechanism may isolate the dropping ball from the other balls behind it, so that they don't apply any unwanted force on the ball that is dropping. This is to stabilize the ball drop and make the motion more consistent through the imaging sphere.

The laser detector is located inside the imaging sphere, a little above the equatorial plane. So as the ball passes through the laser detector, it sends a trigger signal to the cameras to capture the images simultaneously. The purpose of the trigger delay is to offset the time it takes for the ball to get out of the laser field and pass through the equatorial plane, where we intend to image the ball. Imaging the ball on the equatorial plane or in other words, at the center of the sphere gives equidistant images from all the cameras. Had the laser detector been on the equatorial plane, the trigger delay would have been zero, but we can not place the laser detector right where we are imaging, as it would obstruct some of the camera views. Therefore, the laser detector is placed a bit higher, thus clearing the camera view. The trigger delay, defined in microseconds, triggers the cameras to take images not at the time of the ball passing through it but in fact when the ball reaches the equatorial plane or the center of the sphere.

The parameters are currently tuned based on a calibration procedure that involves iteratively dropping the balls and with every drop adjusting the parameters until all the different camera views become homogeneous.

Further, the disclosed systems are faster in execution, simpler in design, and easy to integrate with the overall automation.

Further, the disclosed apparatuses may include an enclosure with illumination inside, multiple cameras, a drop mechanism, and a laser detector to generate the trigger for the cameras.

Further, the present disclosure describes capturing multiple images of the object from multiple views using multiple cameras in an arrangement and processing the individual views in parallel to analyze only the features of interest and not the entire object as a whole.

Further, the present disclosure describes capturing multiple images of the object that does not have any rotational motion from multiple views. Further, the present disclosure describes preventing rotation of the object while the object is in the gravity induced motion.

Further, the present disclosure describes capturing multiple images of the object from multiple views using multiple cameras that are activated on a single trigger, and the object is not larger than the field of view of the cameras. Further, the present disclosure describes performing the imaging of the object at the same instance (i.e., via a single trigger), and producing the result after parallel processing the individual image data captured by the multiple cameras while performing the imaging.

Further, the present disclosure describes capturing multiple images of the object from multiple views using multiple cameras and a number of cameras are carefully selected and positioned to provide just a bit over 100% coverage with some overlap, which is then cut down to ~99% coverage by masking the individual views just enough so that there would not be any need for using the complex math of stitching the images and thereby eliminating duplication of the same feature in multiple views.

Further, the present disclosure describes a system for acquiring a three-dimensional image. Further, the system may include a plurality of cameras, an image sphere, a drop mechanism, a flywheel, a detector, an image acquisition circuit, a processing circuitry, and a memory. Further, the plurality of cameras may include at least six cameras. Further, the drop mechanism may be located at a peripheral region of the image sphere. Further, the flywheel may be configured to control a speed. Further, the detector may include a laser detector. Further, the memory may contain instructions that, when executed by the processing circuitry, configure the system to drop an object into free fall under gravity, detect the dropping of the object, and trigger a plurality of cameras to simultaneously image the object \while the object drops into a bottom half of an imaging sphere at a center of a field of view of each of the plurality of cameras, upon detecting the dropping of the object and construct a three dimensional image of a surface of the object based on the imaged object.

Further, the present disclosure describes imaging of the object using multiple synchronous cameras while the object is in a gravity-induced motion. This allows imaging of the object without any obstruction, which could be critical for certain machine vision based automation applications.

Figure 2:
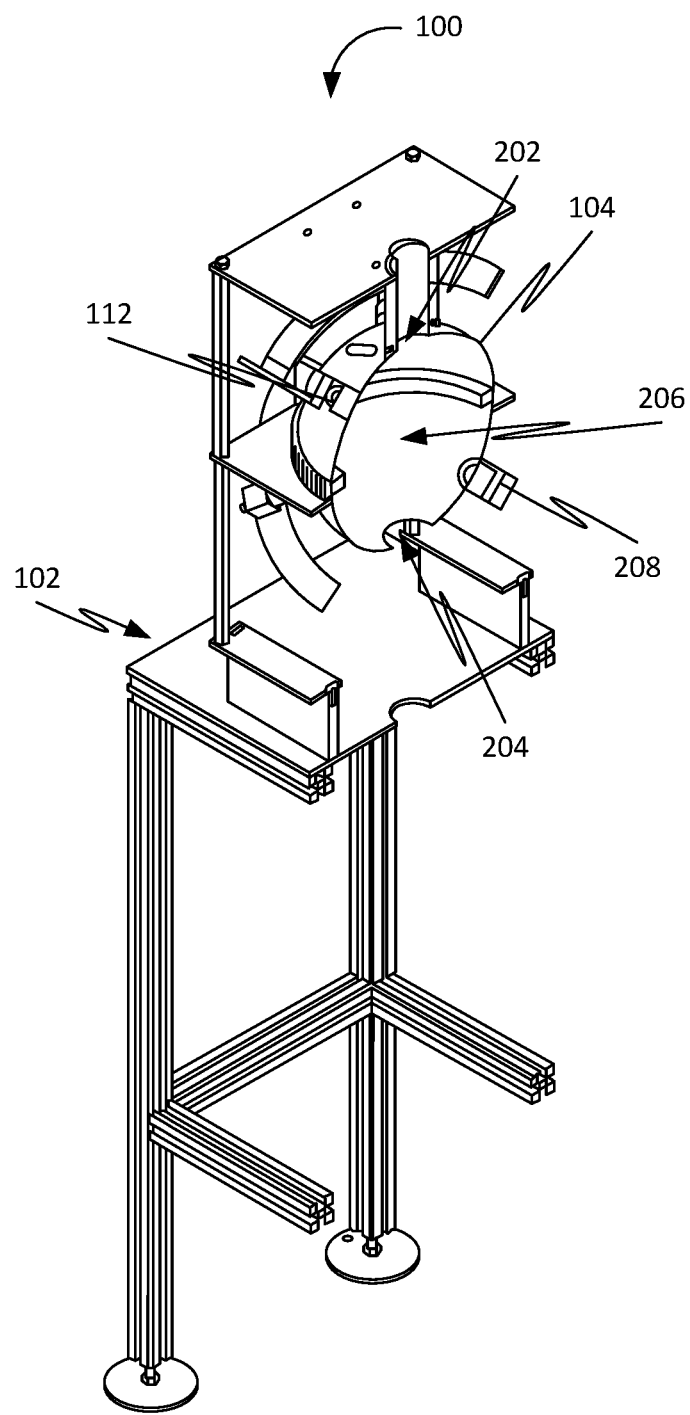
FIG. 2 is a cross sectional view of the apparatus of FIG. 1, in accordance with some embodiments.
Figure 4:
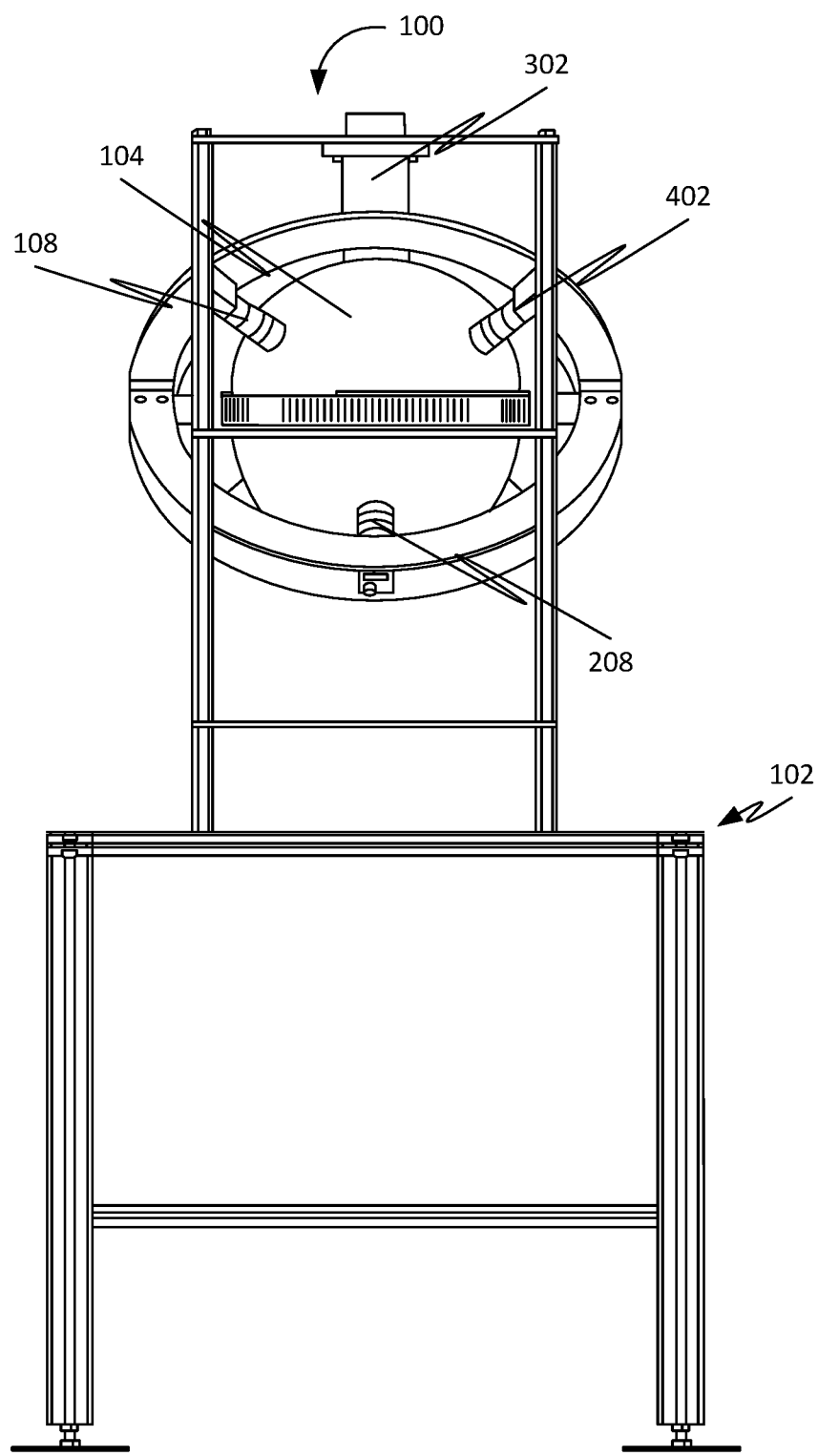
FIG. 4 is a rear view of the apparatus, in accordance with some embodiments.
Figure 5:
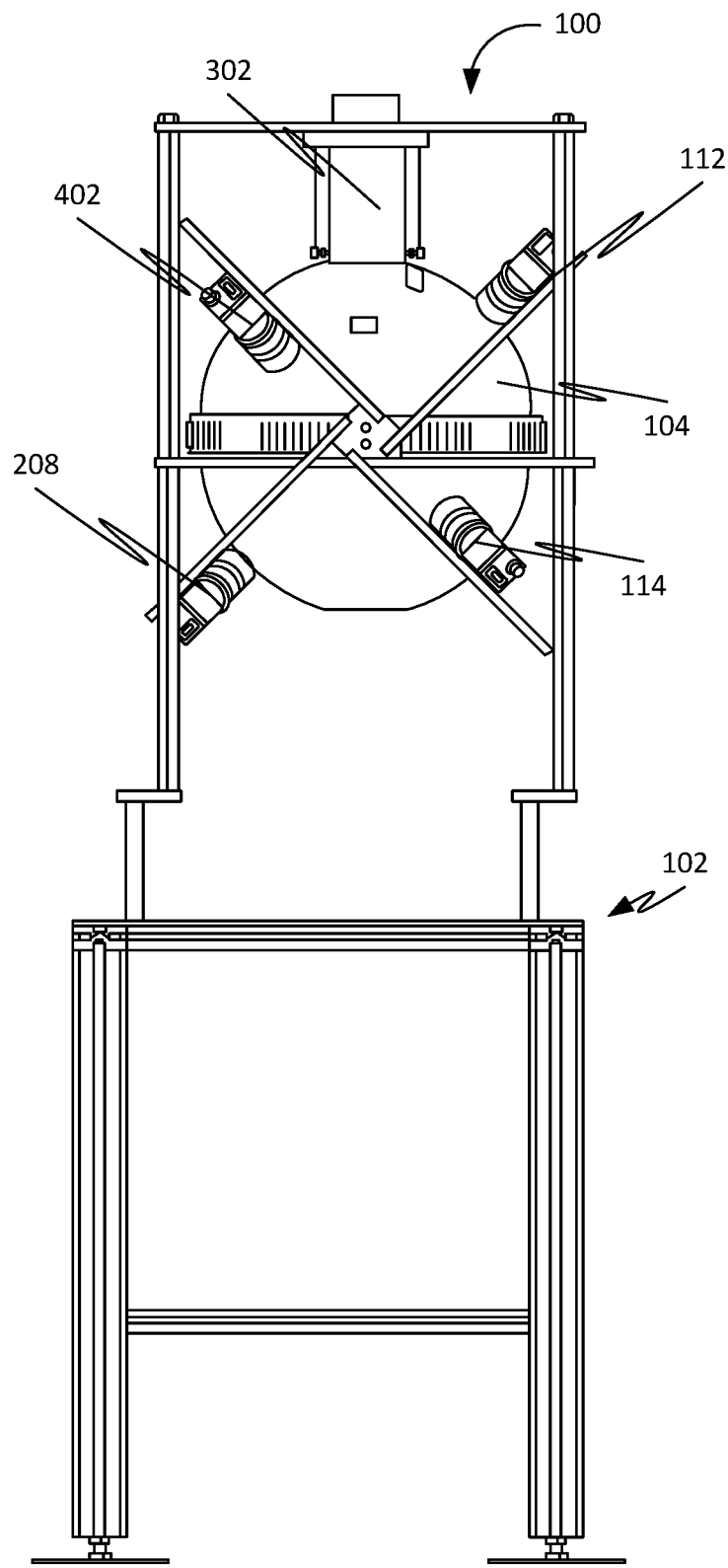
FIG. 5 is a right side view of the apparatus, in accordance with some embodiments.
Figure 6:
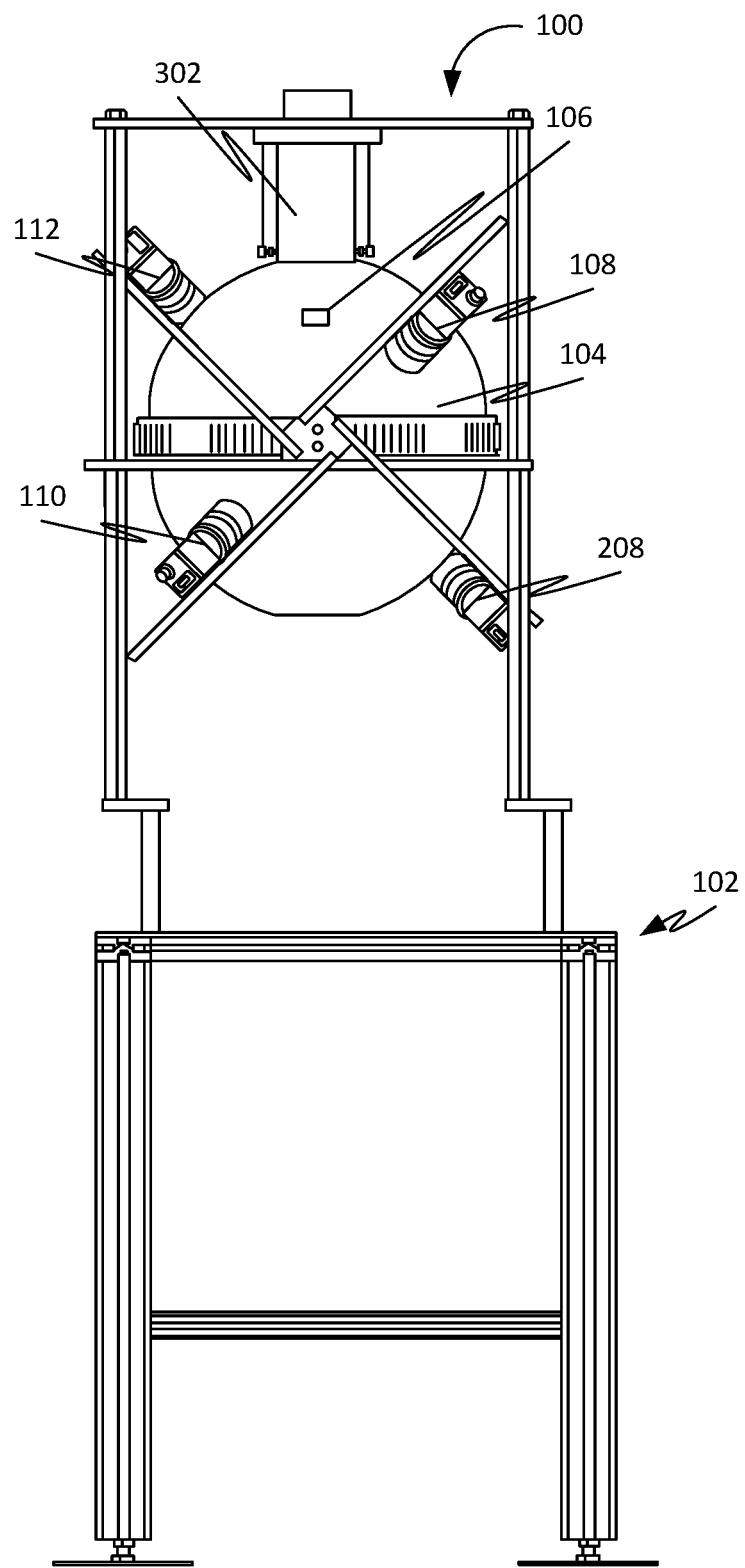
FIG. 6 is a left side view of the apparatus, in accordance with some embodiments.

FIGS. 1, 2, and 4 show an apparatus 100 for facilitating imaging of objects, in accordance with some embodiments. Accordingly, the apparatus 100 may include a frame 102, an imaging sphere 104, at least one detector 106, and a plurality of imaging sensors (108-114, 208, and 402), a processing device 116, and a storage device 118.

The frame 102 may be disposable on at least one surface. Further, the at least one surface may include a ground.

The imaging sphere 104 may be mounted on the frame 102. As shown in FIG. 2, the imaging sphere 104 may include a hollow interior 206, an inlet opening 202, and an outlet opening 204 disposed diametrically opposite to the inlet opening 202. During imaging, an object that is dropped into the imaging sphere 104 from the inlet opening 202 exits the imaging sphere 104 through the outlet opening 204 by passing through the imaging sphere 104.

The object may include a three dimensional solid. Also, the passing of the object through the imaging sphere 104 may include free falling through the imaging sphere 104. In an embodiment, the imaging sphere 104 may be made of opaque materials. Also, in another embodiment, the imaging sphere 104 may be made of transparent materials. Further, in yet another embodiment, the imaging sphere 104 may be made of translucent materials.

In an embodiment, the imaging sphere 104 may isolate the object from environment interferences during the passing of the object through the imaging sphere 104. Also, the imaging sphere 104 may include lighting sources (LED, light bulbs, etc.) for illuminating the object during the passing of the object through the imaging sphere 104. Further, in an embodiment, the imaging sphere 104 may include a coating of light absorbing material (e.g., Vantablack) on an interior surface of the imaging sphere 104.

The at least one detector 106 may be mounted in at least one location on the imaging sphere 104. Also, the at least one detector 106 may be configured for generating at least one trigger signal based on detecting a passing of the object through at least one detecting region of the imaging sphere 104. Here, the at least one detecting region corresponds to the at least one location of the imaging sphere 104. Further, the at least one detector 106 may include a laser detector. In operation, the at least one detector 106 detects the passing of the object based on an interruption of the light signal that may be continuously received by the at least one detector 106. Additionally, the at least one detector 106 may be a light sensor that senses light that is generated by a light emitter (LED, LD, etc.). Further, the at least one detecting region may include a latitudinal plane of the imaging sphere 104.

The plurality of imaging sensors (108-114, 208, and 402) may be supported by the frame 102 for mounting the plurality of imaging sensors (108-114, 208, and 402) in a plurality of locations on the imaging sphere 104. Here, the plurality of imaging sensors (108-114, 208, and 402) may include visible light cameras, IR (infrared) cameras, hyperspectral cameras, etc. Also, the plurality of imaging sensors (108-114, 208, and 402) may be communicatively coupled with the at least one detector 106. Further, the plurality of imaging sensors (108-114, 208, and 402) may be configured for simultaneously imaging the object passing through the imaging sphere 104 from the plurality of locations based on the at least one trigger signal. In an embodiment, the plurality of imaging sensors (108-114, 208, and 402) may be configured for simultaneously generating a plurality of images of the object based on a single trigger signal, as the object passes through at least one imaging region of the imaging sphere 104 based on the simultaneously imaging.

The plurality of images may include two dimensional (2D) images of a plurality of surfaces of the objects. Also, the plurality of images corresponds to a plurality of views of the object viewed from the plurality of locations. Further, the at least one imaging region may include an equatorial plane of the imaging sphere 104. Also, the latitudinal plane may be vertically spaced by at least one distance from the equatorial plane.

The processing device 116 may be communicatively coupled with the plurality of imaging sensors (108-114, 208, and 402). Also, the processing device 116 may be configured for initial processing the received image data, and analyzing the plurality of processed images. Further, the processing device 116 may be configured for generating an image of the object based on the analyzing. Also, the image may be a surface of the object. Further, in an embodiment, the analyzing of the plurality of images may include parallel processing the plurality of images, and identifying/recognizing the object being imaged. Also, the generating of the image may be based on the parallel processing. As an added capability, the images of the 3D object generated may be reconstructed into a 3D representation utilizing parallel processing. Further, the processing device 116 may include a plurality of processing units dedicated to the parallel processing of the plurality of images.

Parallel processing is the process of using simultaneous computing resources to process images, by dividing the processing task to be processed simultaneously by parallel computing units. (E.g., by having multiple computers combined together with a high-speed network; or a shared memory multiprocessor by connecting multiple processors to a single memory system, or chip). By using parallel processing to process the plurality of images captured, maximum processing efficiency may be achieved within minimum time.

The processing task may be a program or a set of commands to be executed by a processor. A parallel program may include numerous tasks to be processed by multiple processors.

In an embodiment, single or multiple Graphics Processing Units (GPUs) core(s) are used for parallel processing. That is, each image data is processed through multiple GPU cores, and multiple images are analyzed in parallel processes. GPUs typically have a large number of cores that can process simple mathematical operations in parallel. For example, the GPU used for data processing may have over 10,000 cores. Other portable versions may have over 500 cores. In comparison some mid to high range CPUs typically have 8 to 32 cores. Using special parallelization programming the data in the GPU cores may be processed to obtain the results more quickly.

A shared memory may be readily accessed by the various processors, where concurrent tasks have similar pictures of memory, with similar logical memory locations.

The storage device 118 may be communicatively coupled with the processing device 116. Also, the storage device 118 may be configured for storing the image.

Figure 10:
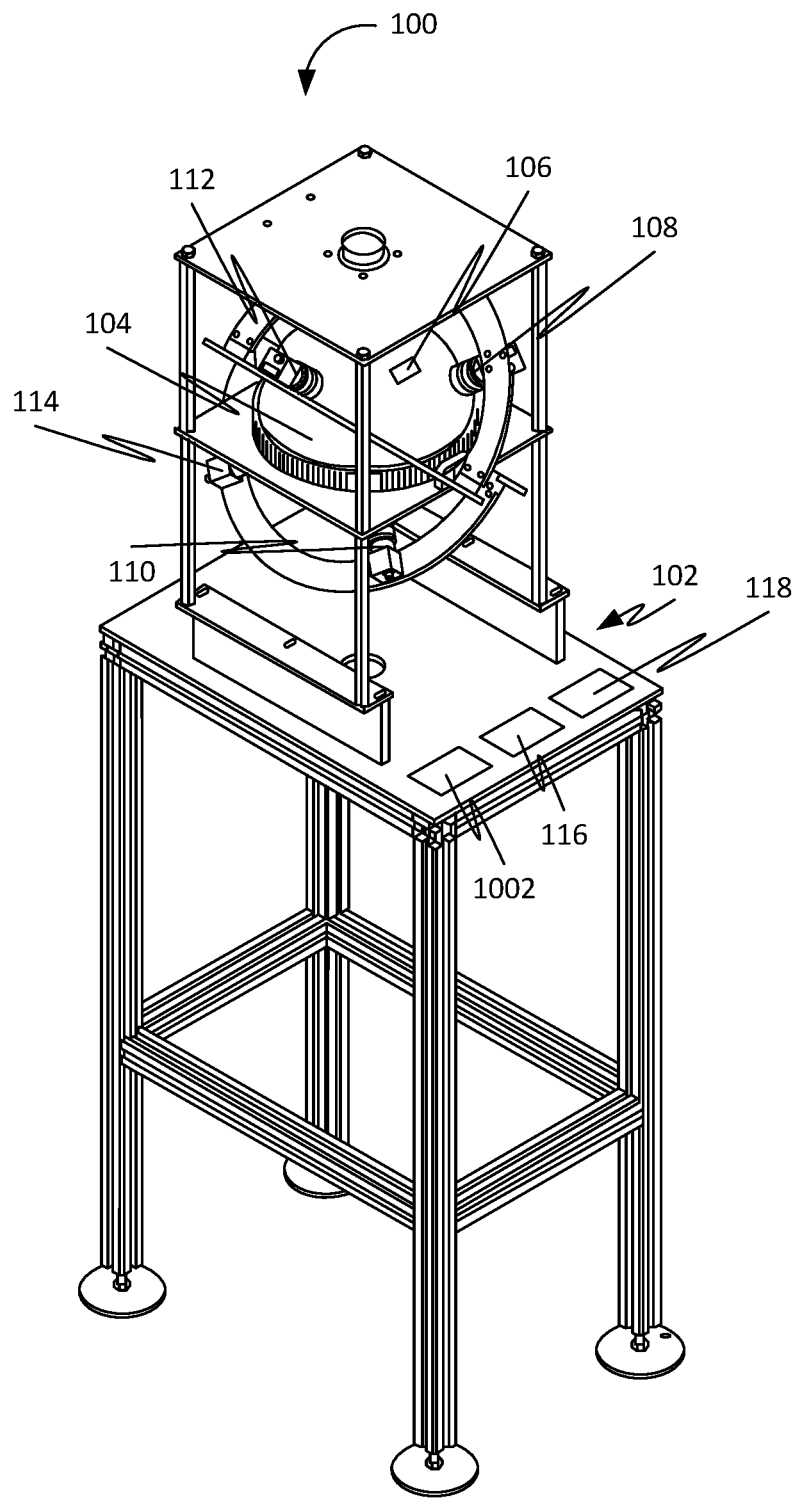
FIG. 10 is a perspective view of the apparatus, in accordance with some embodiments.

In further embodiments, the apparatus 100 may include an input device 1002, as shown in FIG. 10. Here, the input device 1002 may include switches, buttons, a digital display with virtual switches and buttons, etc. The input device 1002 may be communicatively coupled with the processing device 116. The input device 1002 may be configured for generating a first input. Here, the generating of the first input may correspond to a push of a first button. Also, the processing device 116 may be configured for generating a first command for the at least one detector 106 based on the first input. Further, the processing device 116 may be communicatively coupled with the at least one detector 106. Also, the generating of the at least one trigger signal may be based on the first command.

In an embodiment, the input device 1002 may be configured for generating a second input. Also, the processing device 116 may be configured for generating a second command for the at least one detector 106 based on the second input. Further, the generating of the second input may correspond to a push of a second button. Also, the at least one detector 106 may be configured for generating at least one data based on detecting at least one characteristic of the object passing through the at least one detecting region of the imaging sphere 104 and the second command. Further, the at least one characteristic may include a size of the object, a shape of the object, a cross-section of the object, etc.

Also, in an embodiment, the processing device 116 may be configured for analyzing the at least one data. Also, the processing device 116 may be configured for generating at least one value for at least one parameter associated with the plurality of imaging sensors (108-114, 208, and 402) based on the analyzing of the at least one data. The at least one parameter may include a time delay for initiating the simultaneous imaging after the generating of the at least one trigger signal. Also, the at least one value for the time delay may include at least one microsecond, at least one millisecond, at least one second, etc. Further, the at least one parameter may include at least one image acquisition parameter for acquiring (the simultaneous generating) of the plurality of images based on the simultaneous imaging. Also, the at least one image acquisition parameter may include a focal length, an angle of view, a shutter speed, an exposure level, etc. Further, the plurality of imaging sensors (108-114, 208, and 402) may be configured for calibrating the at least one parameter of the plurality of imaging sensors (108-114, 208, and 402) based on the at least one value for the simultaneously imaging of the object in the at least one imaging region of the imaging sphere 104. Also, the calibrating of the at least one parameter of the plurality of imaging sensors may include setting the at least one value for the at least one parameter.

In an embodiment, the storage device 118 may be configured for retrieving at least one detecting region information associated with the at least one detecting region and at least one imaging region information associated with the at least one imaging region. Also, the at least one detecting region information may include information associated with a location, an orientation, a shape, a dimension, etc. of the at least one detecting region. Further, the at least one imaging region information may include information associated with a location, an orientation, a shape, a dimension, etc. of the at least one imaging region. Also, the processing device 116 may be configured for analyzing the at least one detecting region information and the at least one imaging region information. Further, the generating of the at least one value for the at least one parameter may be based on the analyzing of at least one detecting region information and the at least one imaging region information.

In an embodiment, the analyzing of the at least one data may include analyzing the at least one data using at least one machine learning model. Further, the at least one machine learning model may be trained for predicting values for parameters of the plurality of imaging sensors (108-114, 208, and 402) based on characteristics of the object. Also, the at least one machine learning model may be trained by feeding inputs including a plurality of trial images of the object simultaneously imaged by the plurality of imaging sensors (108-114, 208, and 402) via a single imaging trigger, and a plurality of trial values for the at least one parameter for the simultaneously imaging of the plurality of trial images. Here, the output may include a plurality of required images of the object. Further, the object may be iteratively dropped into the imaging sphere for simultaneously generating the plurality of trial images based on the simultaneous imaging via the single imaging trigger. Also, the at least one machine learning model may be trained until the plurality of trial images become homogeneous. Further, the generating of the at least one value for the at least one parameter associated with the plurality of imaging sensors (108-114, 208, and 402) may be based on the analyzing of the at least one data using the at least one machine learning model.

Figure 3:
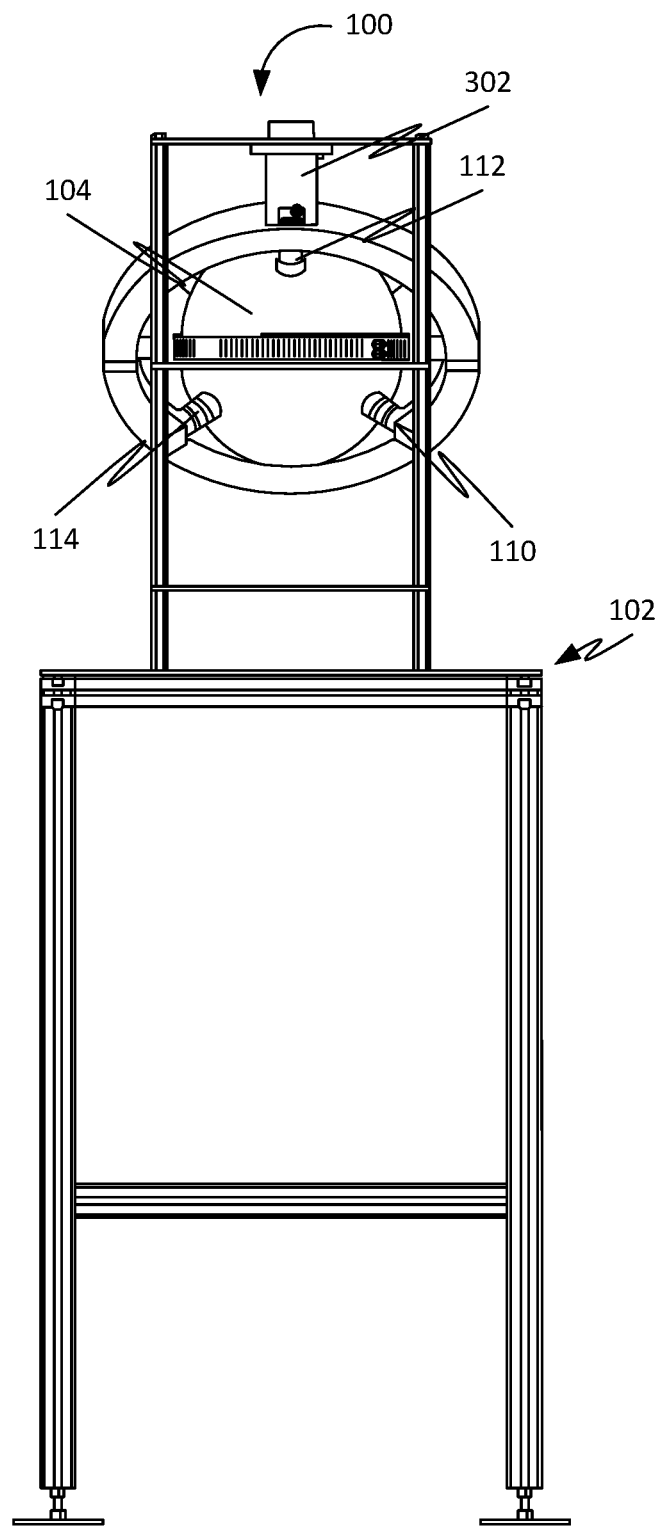
FIG. 3 is a front view of the apparatus, in accordance with some embodiments.
Figure 7:
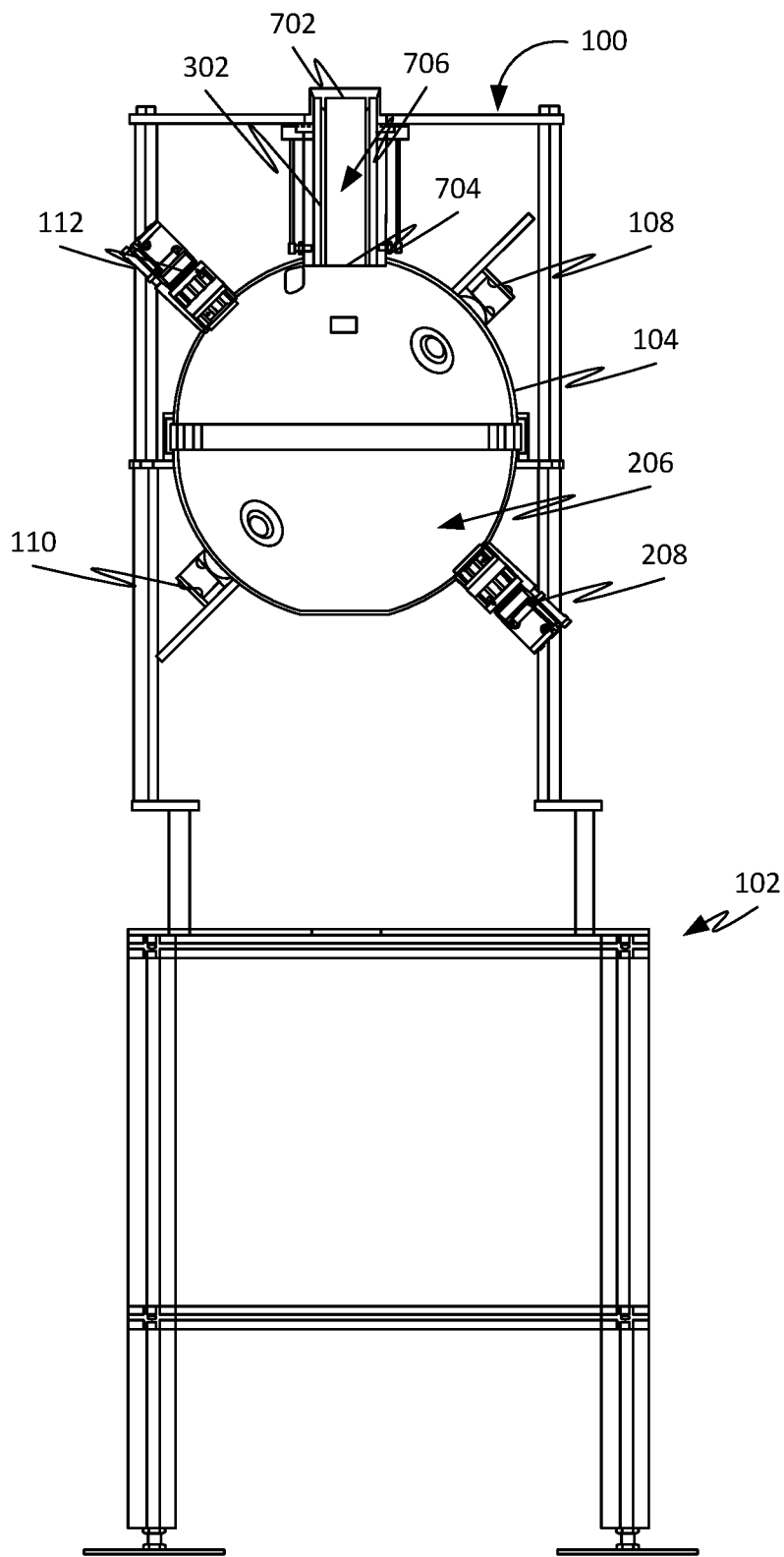
FIG. 7 is a cross sectional view of the apparatus of FIG. 6, in accordance with some embodiments.
Figure 8:
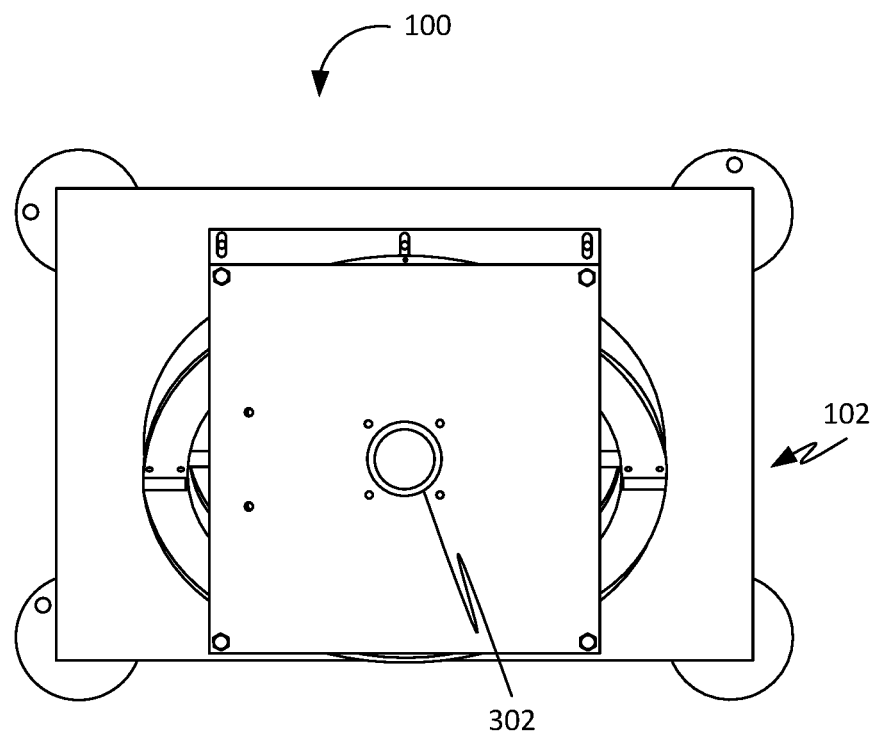
FIG. 8 is a top side view of the apparatus, in accordance with some embodiments.
Figure 9:
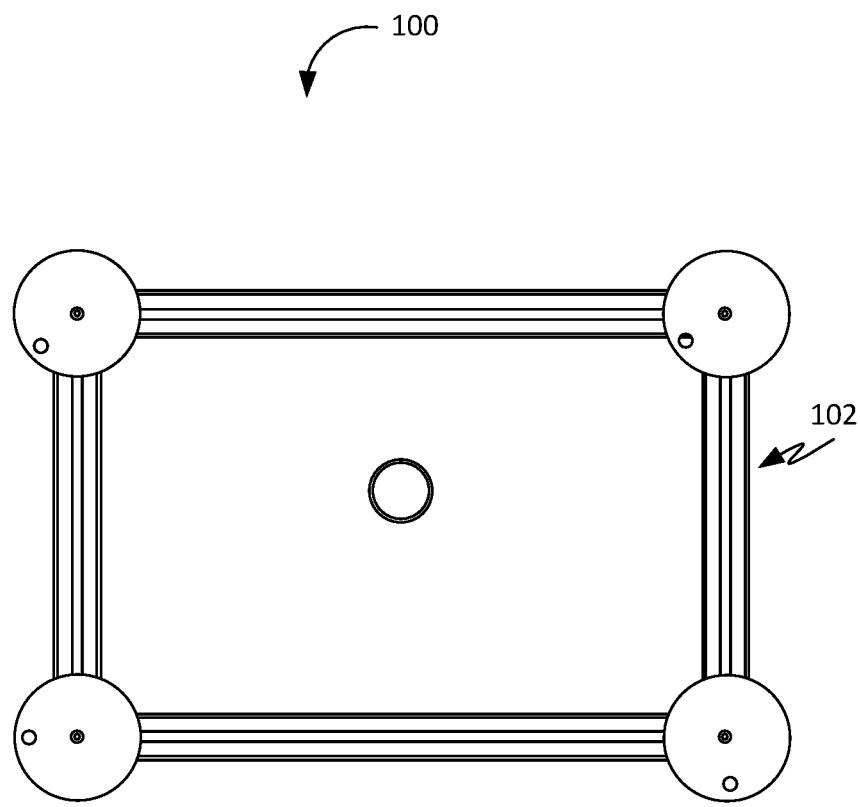
FIG. 9 is a bottom side view of the apparatus, in accordance with some embodiments.

Referring to FIG. 3, the apparatus 100 may include a feeding tube 302. Here, the feeding tube 302 may be supported by the frame 102 for vertically mounting the feeding tube 302 on the imaging sphere 104. Also, referring to FIG. 7, the feeding tube 302 may include an inlet 702, an outlet 704, and an internal cavity 706 coupling the inlet 702 to the outlet 704. Here, the outlet 704 may be coupled with the inlet opening 202 based on the vertically mounting for coupling the internal cavity 706 with the hollow interior 206 of the imaging sphere 104. Also, the object may be placed in the inlet 702 for dropping the object into the imaging sphere 104. Further, the placing of the object in the inlet 702 for the dropping of the object into the imaging sphere 104 does not impart rotation to the object passing through the imaging sphere 104.

In some embodiments, the plurality of imaging sensors (108-114, 208, and 402) may include six imaging sensors. Here, the six imaging sensors include a first pair of imaging sensors 108-114, a second pair of imaging sensors 112-208, and a third pair of imaging sensors 110-402. The first pair of imaging sensors 108-114 may be mounted on the imaging sphere 104 along a first axis of the imaging sphere 104, the second pair of imaging sensors 112-208 may be mounted on the imaging sphere 104 along a second axis of the imaging sphere 104, and the third pair of imaging sensors 110-402 may be mounted on the imaging sphere 104 along a third axis of the imaging sphere 104. Further, each of the first axis, the second axis, and the third axis may be mutually perpendicular.

Further, in an embodiment, a first imaging sensor 108 of the first pair of imaging sensors 108-114 may be mounted in a first direction along the first axis, and a second imaging sensor 114 of the first pair of imaging sensors 108-114 may be mounted in a second direction opposite to the first direction along the first axis. Also, a first imaging sensor 112 of the second pair of imaging sensors 112-208 may be mounted in a first direction along the second axis and a second imaging sensor 208 of the second pair of imaging sensors 112-208 may be mounted in a second direction opposite to the first direction along the second axis. Further, a first imaging sensor 110 of the third pair of imaging sensors 110-402 may be mounted in a first direction along the third axis and a second imaging sensor 402 of the third pair of imaging sensors 110-402 may be mounted in a second direction opposite to the first direction along the third axis.

Figure 11:
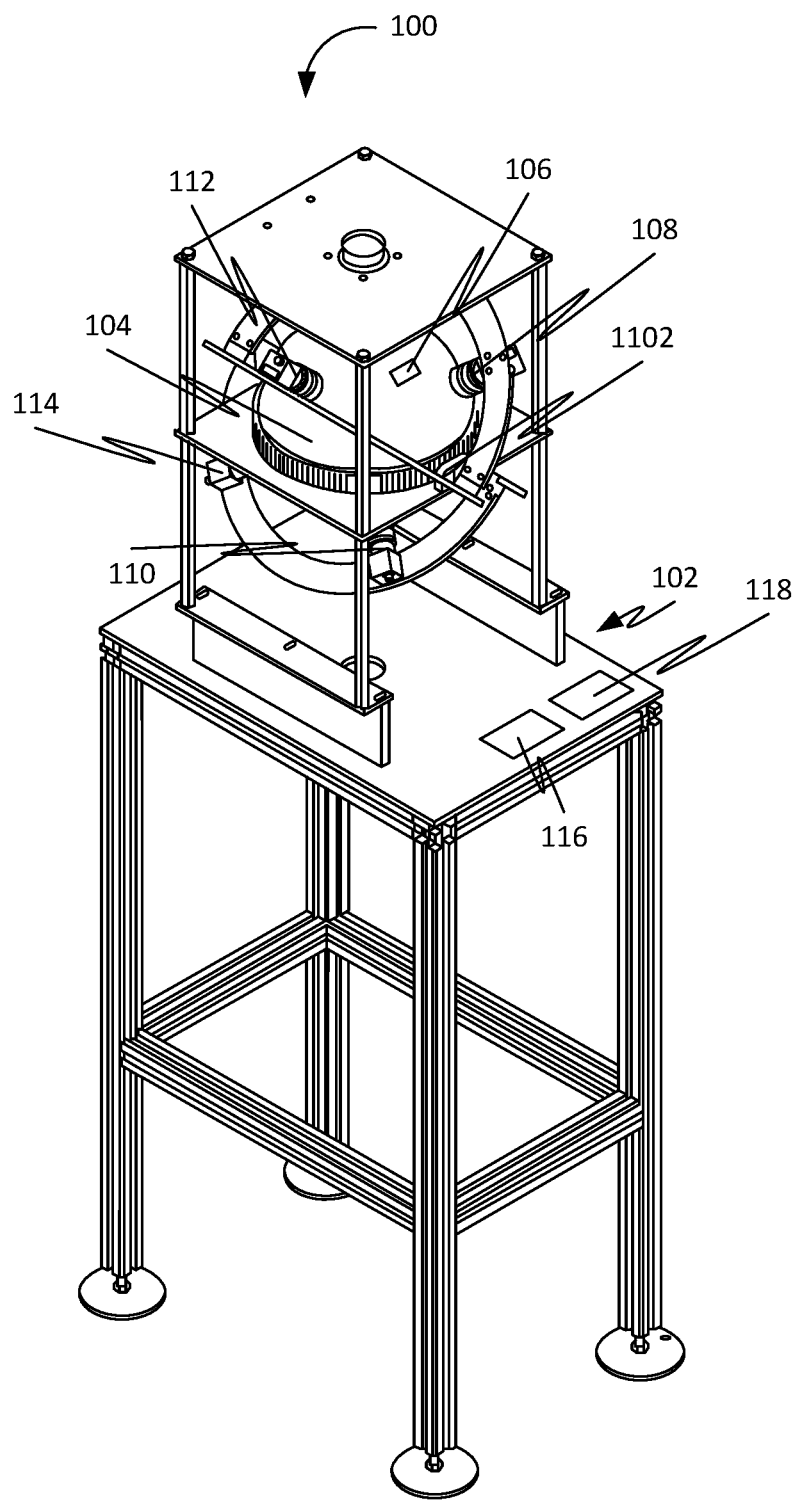
FIG. 11 is a perspective view of the apparatus, in accordance with some embodiments.

Referring to FIG. 11, the imaging sphere 104 may be orientably mounted on the frame 102 using at least one orienting mechanism 1102. The at least one orienting mechanism 1102 may be a ball joint mechanism. Also, the imaging sphere 104 may be configured to transition between a plurality of orientations for aligning a central axis of the inlet opening 202 and the outlet opening 204 with the force of gravity. Further, the passing of the object through the imaging sphere 104 may be based on the aligning of the central axis of the inlet opening 202 and the outlet opening 204 with the force of gravity.

Figure 12:
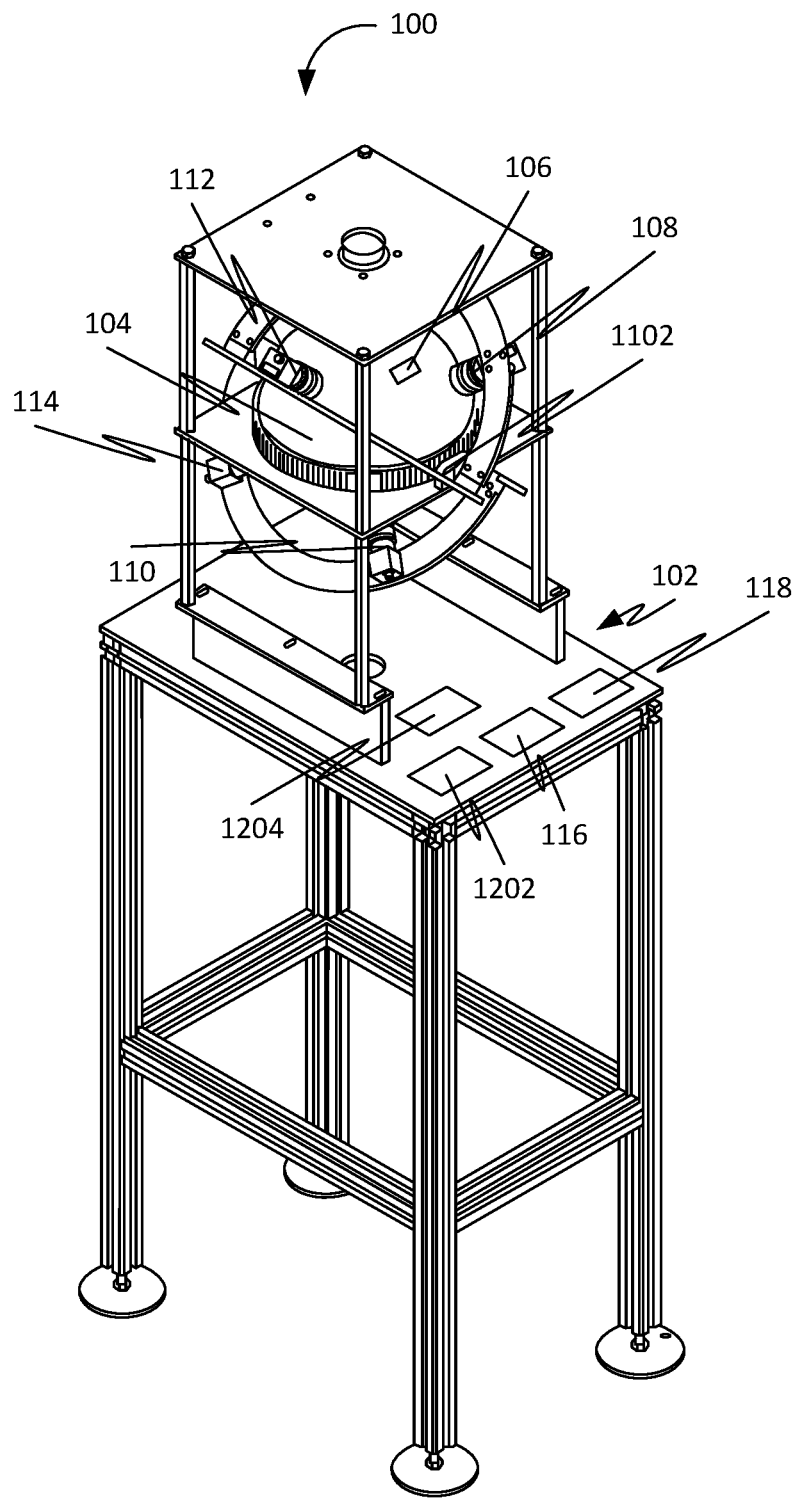
FIG. 12 is a perspective view of the apparatus, in accordance with some embodiments.

Referring to FIG. 12, the apparatus 100 may include at least one sensor 1202 and at least one actuator 1204. Here, the at least one sensor 1202 may be configured for generating at least one sensor data based on detecting an alignment of the central axis of the inlet opening 202 and the outlet opening 204 with the force of gravity. Also, the at least one sensor 1202 may include an orientation sensor. Further, the at least one sensor 1202 may be communicatively coupled with the processing device 116. Here, the processing device 116 may be configured for analyzing the at least one sensor data. Also, the processing device 116 may be configured for determining an orientation from the plurality of orientations for the imaging sphere 104 based on the analyzing of the at least one sensor data. Further, the processing device 116 may be configured for generating at least one command for transitioning the imaging sphere 104 to the orientation based on the determining of the orientation. Also, the at least one actuator 1204 may be communicatively coupled with the processing device 116. Further, the at least one actuator 1204 may be operatively coupled with the at least one orienting mechanism 1102. Also, the at least one actuator 1204 may be configured for transitioning the imaging sphere 104 to the orientation based on the at least one command. Further, the at least one actuator 1204 may include a servo motor, a stepper motor, etc.

In some embodiments, the analyzing of the plurality of images may include analyzing at least one pre-selected feature from a plurality of features of each of the plurality of images. Here, the plurality of features includes at least one of a shape feature, a spatial feature, an edge feature, etc. of the plurality of images. Also, the generating of the image may be based on the analyzing of the at least one pre-selected feature from the plurality of features of each of the plurality of images.

Further, in some embodiments, each of the plurality of images overlaps with at least one of the plurality of images in at least a part. Further, the analyzing of the plurality of images may include masking at least one portion of at least one of the plurality of images for removing the overlapping of at least one of the plurality of images with each of the plurality of images. Further, the generating of the image may be based on the masking.

Figure 13:
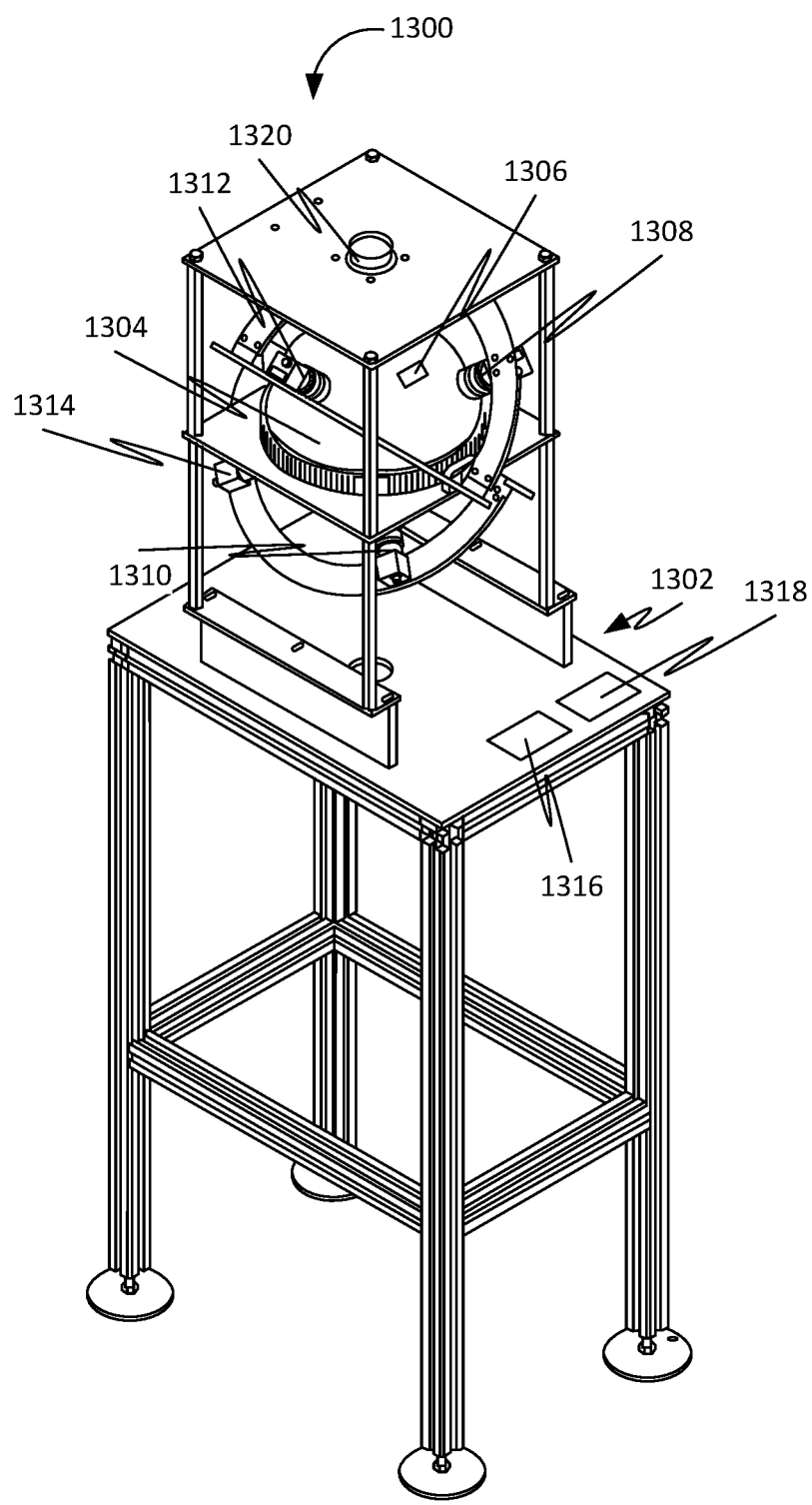
FIG. 13 is a perspective view of an apparatus for facilitating imaging of objects, in accordance with some embodiments.

FIG. 13 is a perspective view of an apparatus 1300 for facilitating imaging of objects, in accordance with some embodiments. The apparatus 1300 may include a frame 1302, an imaging sphere 1304, at least one detector 1306, a plurality of imaging sensors (1308-1314), a processing device 1316, a storage device 1318, and a feeding tube 1320.

The frame 1302 may be disposable on at least one surface. Also, the imaging sphere 1304 may be mounted on the frame 1302. Further, the imaging sphere 1304 may include a hollow interior, an inlet opening, and an outlet opening disposed diametrically opposite to the inlet opening. Also, an object dropped into the imaging sphere 1304 from the inlet opening exits the imaging sphere 1304 through the outlet opening by passing through the imaging sphere 1304. Further, the passing of the object through the imaging sphere 1304 may include free falling through the imaging sphere 1304. Also, the at least one detector 1306 may be mounted in at least one location on the imaging sphere 1304. Further, the at least one detector 1306 may be configured for generating at least one trigger signal based on detecting a passing of the object through at least one detecting region of the imaging sphere 1304. Also, the at least one detecting region corresponds to the at least one location.

The plurality of imaging sensors (1308-1314) may be supported by the frame 1302 for mounting the plurality of imaging sensors (1308-1314) in a plurality of locations on the imaging sphere 1304. Also, the plurality of imaging sensors (1308-1314) may be communicatively coupled with the at least one detector 1306. Further, the plurality of imaging sensors (1308-1314) may be configured for simultaneously imaging the object passing through the imaging sphere 1304 from the plurality of locations based on the at least one trigger signal. Also, the plurality of imaging sensors (1308-1314) may be configured for simultaneously generating a plurality of images of the object passing through at least one imaging region of the imaging sphere 1304 based on the simultaneous imaging. Further, the plurality of images corresponds to a plurality of views of the object viewed from the plurality of locations.

The processing device 1316 may be communicatively coupled with the plurality of imaging sensors (1308-1314). Also, the processing device 1316 may be configured for analyzing the plurality of images. Further, the processing device 1316 may be configured for reconstructing the plurality of images into a three-dimensional (3D) image of the object based on the analyzing.

The storage device 1318 may be communicatively coupled with the processing device 1316. Also, the storage device 1318 may be configured for storing the image.

The feeding tube 1320 may be supported by the frame 1302 for vertically mounting the feeding tube 1320 on the imaging sphere 1304. Also, the feeding tube 1320 may include an inlet, an outlet, and an internal cavity coupling the inlet to the outlet. Further, the outlet may be coupled with the inlet opening based on the vertically mounting for coupling the internal cavity with the hollow interior of the imaging sphere 1304. Also, the object may be placed in the inlet for dropping the object into the imaging sphere 1304. Further, the placing of the object in the inlet for the dropping of the object into the imaging sphere 1304 does not impart rotation to the object passing through the imaging sphere 1304.

In further embodiments, the apparatus 1300 may include an input device. Here, the input device may be communicatively coupled with the processing device 1316. Also, the input device may be configured for generating a first input. Further, the processing device 1316 may be configured for generating a first command for the at least one detector 1306 based on the first input. Also, the processing device 1316 may be communicatively coupled with the at least one detector 1306. Further, the generating of the at least one trigger signal may be based on the first command.

In an embodiment, the input device may be configured for generating a second input. Here, the processing device 1316 may be configured for generating a second command for the at least one detector 1306 based on the second input. Further, the at least one detector 1306 may be configured for generating at least one data based on detecting at least one characteristic of the object passing through the at least one detecting region of the imaging sphere 1304 and the second command.

Also, in an embodiment, the processing device 1316 may be configured for analyzing the at least one data. Also, the processing device 1316 may be configured for generating at least one value for at least one parameter associated with the plurality of imaging sensors (1308-1314) based on the analyzing of the at least one data. Further, the plurality of imaging sensors (1308-1314) may be configured for calibrating the at least one parameter of the plurality of imaging sensors (1308-1314) based on the at least one value for the simultaneously imaging of the object in the at least one imaging region of the imaging sphere 1304.

The storage device 1318 may be configured for retrieving at least one detecting region information associated with the at least one detecting region and at least one imaging region information associated with the at least one imaging region.

Also, the processing device 1316 may be configured for analyzing the at least one detecting region information and the at least one imaging region information. Further, the generating of the at least one value for the at least one parameter may be based on the analyzing of the at least one detecting region information and the at least one imaging region information.

In an embodiment, the analyzing of the at least one data may include analyzing the at least one data using at least one machine learning model. The at least one machine learning model may be trained for predicting values for parameters of the plurality of imaging sensors (1308-1314) based on characteristics of the object. Also, the generating of the at least one value for the at least one parameter associated with the plurality of imaging sensors (1308-1314) may be based on the analyzing of the at least one data using the at least one machine learning model.

Figure 14:
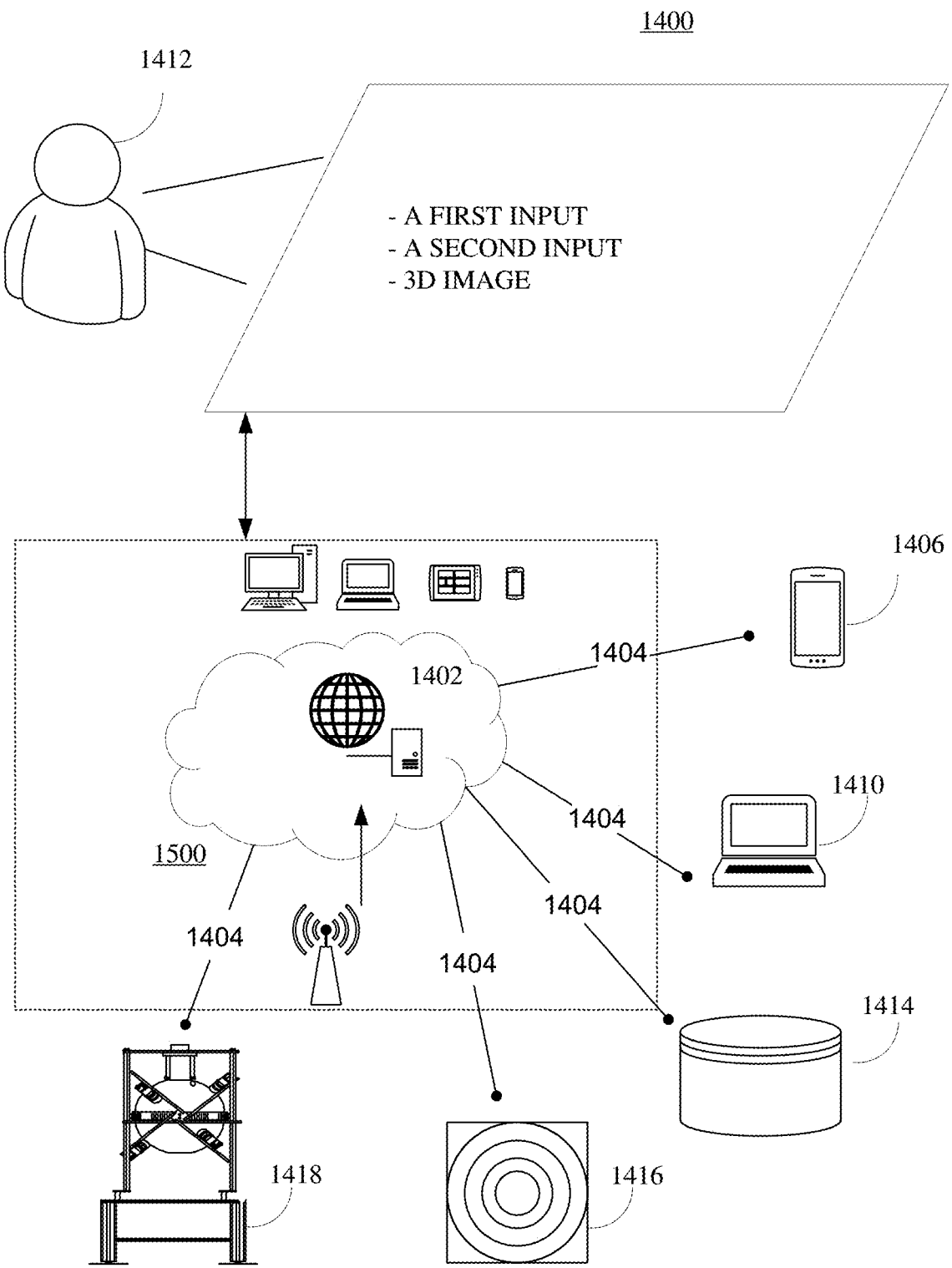
FIG. 14 is an illustration of an online platform consistent with various embodiments of the present disclosure.

FIG. 14 is an illustration of an online platform 1400 consistent with various embodiments of the present disclosure. By way of non-limiting example, the online platform 1400 to facilitate imaging of objects may be hosted on a centralized server 1402, such as, for example, a cloud computing service. The centralized server 1402 may communicate with other network entities, such as, for example, a mobile device 1406 (such as a smartphone, a laptop, a tablet computer, etc.), other electronic devices 1410 (such as desktop computers, server computers, etc.), databases 1414, sensors 1416, and an apparatus 1418 (such as the apparatus 100 and the apparatus 1300) over a communication network 1404, such as, but not limited to, the Internet. Also, users of the online platform 1400 may include relevant parties such as, but not limited to, end-users, administrators, service providers, service consumers, and so on. Accordingly, in some instances, electronic devices operated by the one or more relevant parties may be in communication with the platform.

A user 1412, such as the one or more relevant parties, may access online platform 1400 through a web based software application or browser. The web based software application may be embodied as, for example, but not be limited to, a website, a web application, a desktop application, and a mobile application compatible with a computing device 1500.

Figure 15:
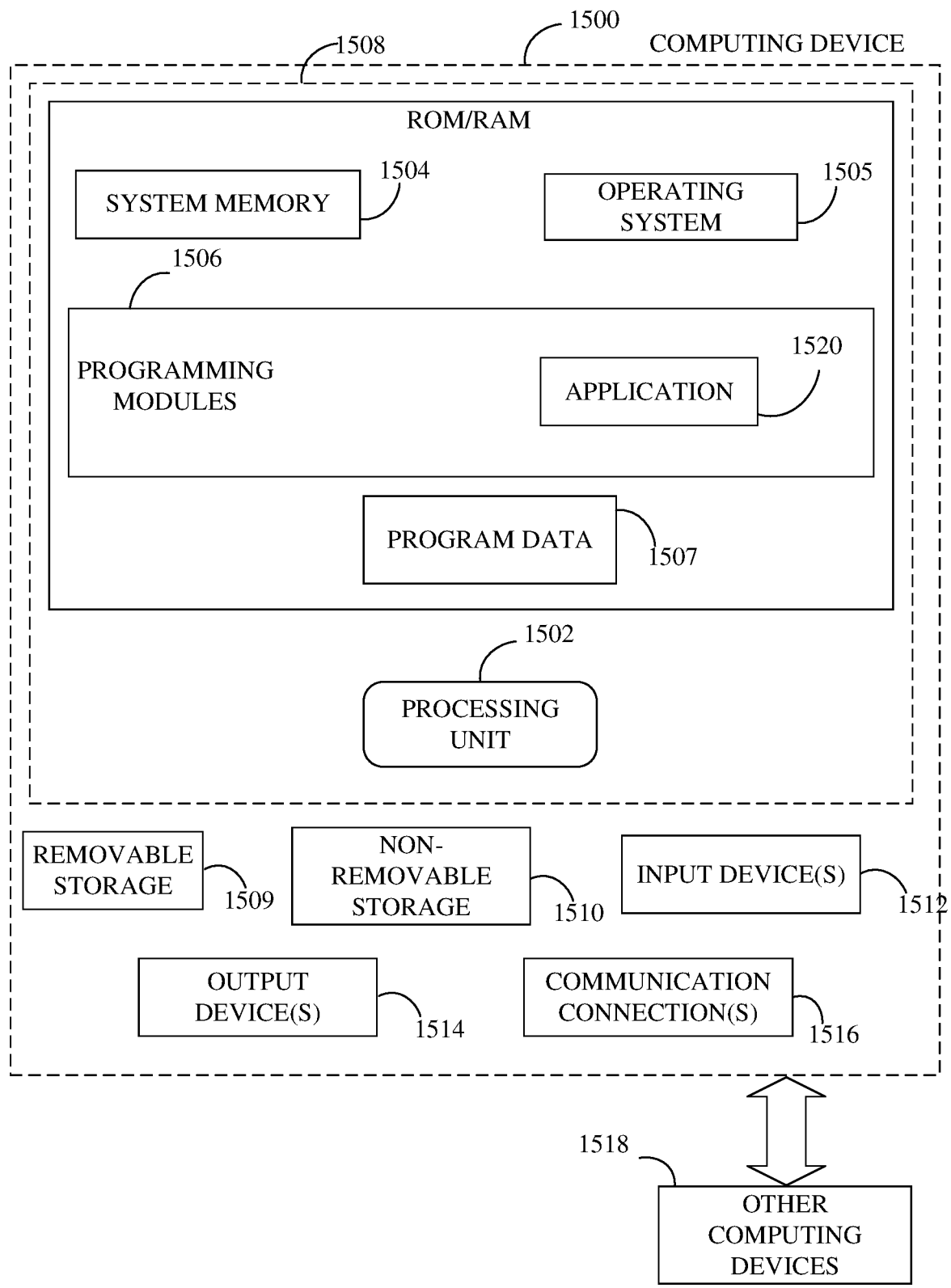
FIG. 15 is a block diagram of a computing device for implementing the methods disclosed herein, in accordance with some embodiments.

Referring to FIG. 15, a system consistent with an embodiment of the disclosure may include a computing device or cloud service, such as computing device 1500. In a basic configuration, computing device 1500 may include at least one processing unit 1502 and a system memory 1504. Depending on the configuration and type of computing device, system memory 1504 may include, but is not limited to, volatile (e.g., random-access memory (RAM)), non-volatile (e.g., read-only memory (ROM)), flash memory, or any combination. System memory 1504 may include operating system 1505, one or more programming modules 1506, and may include a program data 1507. Operating system 1505, for example, may be suitable for controlling computing device 1500's operation. In one embodiment, programming modules 1506 may include image-processing module, machine learning module. Furthermore, embodiments of the disclosure may be practiced in conjunction with a graphics library, other operating systems, or any other application program and is not limited to any particular application or system. This basic configuration is illustrated in FIG. 15 by those components within a dashed line 1508.

Computing device 1500 may have additional features or functionality. For example, computing device 1500 may also include additional data storage devices (removable and/or non-removable) such as, for example, magnetic disks, optical disks, or tape. Such additional storage is illustrated in FIG. 15 by a removable storage 1509 and a non-removable storage 1510. Computer storage media may include volatile and non-volatile, removable and non-removable media implemented in any method or technology for storage of information, such as computer-readable instructions, data structures, program modules, or other data. System memory 1504, removable storage 1509, and non-removable storage 1510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1500. Any such computer storage media may be part of device 1500. Computing device 1500 may also have input device(s) 1512 such as a keyboard, a mouse, a pen, a sound input device, a touch input device, a location sensor, a camera, a biometric sensor, etc. Output device(s) 1514 such as a display, speakers, a printer, etc. may also be included. The aforementioned devices are examples and others may be used.

Computing device 1500 may also contain a communication connection 1516 that may allow device 1500 to communicate with other computing devices 1518, such as over a network in a distributed computing environment, for example, an intranet or the Internet. Communication connection 1516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1504, including operating system 1505. While executing on processing unit 1502, programming modules 1506 (e.g., application 1520 such as a media player) may perform processes including, for example, one or more stages of methods, algorithms, systems, applications, servers, databases as described above. The aforementioned process is an example, and processing unit 1502 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit including discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 16:
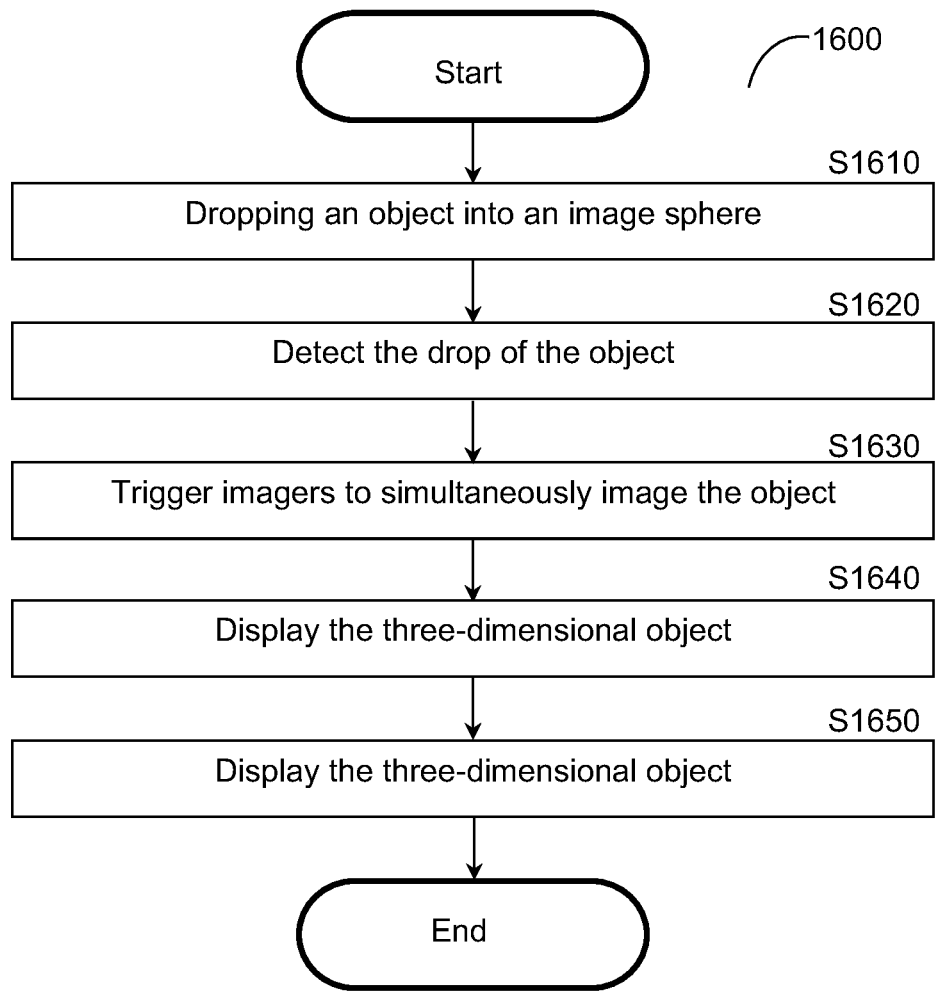
FIG. 16 is a flow chart diagram showing a method for imaging a three-dimensional image, according to an embodiment.

According to some aspects, and referring to FIG. 16, a method 1600 for acquiring a three-dimensional image is disclosed. At S1610, an object is dropped into free fall under gravity into an image sphere. Next, at S1620, the dropping of the object is detected. Further, at S1630, a plurality of imagers (e.g., cameras) are triggered to simultaneously image the object in parallel, while the object drops into a bottom half of the imaging sphere at a center of a field of view of each of the plurality of cameras, upon detecting the dropping of the object. Afterwards, at S1640, the images of the object are analyzed in parallel. In an embodiment, the analysis may be performed using a trained machine learning model. At S1650, an image of a surface of the object is created and displayed based on the analysis of the imaged object. In an embodiment, the surface of the image can be displayed in 3D.

According to some aspects, a non-transitory computer readable medium having stored thereon instructions for causing a processing circuitry to execute a process is disclosed. Further, the process may include dropping an object into free fall under gravity. Further, the process may include detecting the dropping of the object. Further, the process may include triggering a plurality of cameras to simultaneously image the object while the object drops into the bottom half of an imaging sphere at a center of a field of view of each of the plurality of cameras, upon detecting the dropping of the object. Further, the process may include constructing a three dimensional image of a surface of the object based on the imaged object.

According to some aspects, a system for acquiring a three-dimensional image is disclosed. Further, the system may include a plurality of cameras, an image sphere, a drop mechanism, a flywheel, a detector, an image acquisition circuit, a processing circuitry, and a memory. Further, the plurality of cameras may include at least six cameras. Further, the drop mechanism may be located at a peripheral region of the image sphere. Further, the flywheel may be configured to control a speed. Further, the detector may include a laser detector. Further, the memory may contain instructions that, when executed by the processing circuitry, configure the system to drop an object into free fall under gravity, detect the dropping of the object, and trigger a plurality cameras to simultaneously image the object while the object drops into a bottom half of an imaging sphere at a center of a field of view of each of the plurality of cameras, upon detecting the dropping of the object and construct a three dimensional image of a surface of the object based on the imaged object.

Although the present disclosure has been explained in relation to its preferred embodiment, it is to be understood that many other possible modifications and variations can be made without departing from the spirit and scope of the disclosure.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine including any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements includes one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. An imaging apparatus, comprising:
a frame disposable on at least one surface;
an imaging sphere mounted on the frame, wherein the imaging sphere comprises:
a hollow interior,
an inlet opening, and an outlet opening disposed diametrically opposite to
the inlet opening, wherein:
an object dropped into the imaging sphere from the
inlet opening exits the imaging sphere through the
outlet opening by passing through the imaging
sphere, and
the passing of the object through the imaging sphere
comprises free falling through the imaging sphere;
at least one detector mounted in at least one location on
the imaging sphere, wherein:
the at least one detector is configured for generating at
least one trigger signal based on detecting a passing
of the object through at least one detecting region of
the imaging sphere, and
the at least one detecting region corresponds to the at
least one location;
a plurality of imaging sensors supported by the frame for
mounting the plurality of imaging sensors in a plurality
of locations on the imaging sphere, wherein:
the plurality of imaging sensors is communicatively
coupled with the at least one detector, and
the plurality of imaging sensors is configured for:
simultaneously imaging the object passing through
the imaging sphere from the plurality of locations
in parallel, based on the at least one trigger signal;
and
simultaneously generating a plurality of images of
the object passing through at least one imaging
region of the imaging sphere based on the simultaneously imaging, wherein the plurality of
images corresponds to a plurality of views of the
object viewed from the plurality of locations;
a processing device communicatively coupled with the
plurality of imaging sensors, wherein the processing
device is configured for:
analyzing the plurality of images in parallel; and
generating an image of the object based on the analyzing; and
a storage device communicatively coupled with the processing device, wherein the storage device is configured for storing the image.

2. The apparatus of claim 1 further comprising an input device communicatively coupled with the processing device, wherein:
the input device is configured for generating a first input, wherein the processing device is further configured for generating a first command for the at least one detector based on the first input,
the processing device is communicatively coupled with the at least one detector, and
the generating of the at least one trigger signal includes a single signal generated based on the first command.

3. The apparatus of claim 2, wherein:
the input device is configured for generating a second input, wherein the processing device is further configured for generating a second command for the at least one detector based on the second input, and
the at least one detector is further configured for generating at least one data based on detecting at least one characteristic of the object passing through the at least one detecting region of the imaging sphere and the second command.

4. The apparatus of claim 3, wherein the processing device is further configured for:
analyzing the at least one data; and
generating at least one value for at least one parameter associated with the plurality of imaging sensors based on the analyzing of the at least one data, wherein the plurality of imaging sensors is configured for calibrating the at least one parameter of the plurality of imaging sensors based on the at least one value for the simultaneously imaging of the object in the at least one imaging region of the imaging sphere.

5. The apparatus of claim 4, wherein:
the storage device is further configured for retrieving at least one detecting region information associated with the at least one detecting region and at least one imaging region information associated with the at least one imaging region,
the processing device is further configured for analyzing the at least one detecting region information and the at least one imaging region information, and
the generating of the at least one value for the at least one parameter is further based on the analyzing of the at least one detecting region information and the at least one imaging region information.

6. The apparatus of claim 4, wherein:
the analyzing of the at least one data comprises analyzing the at least one data using at least one machine learning model, wherein the at least one machine learning model is trained for predicting values for parameters of the plurality of imaging sensors based on characteristics of the object, and
the generating of the at least one value for the at least one parameter associated with the plurality of imaging sensors is further based on the analyzing of the at least one data using the at least one machine learning model.

7. The apparatus of claim 1, further comprising a feeding tube supported by the frame for vertically mounting the feeding tube on the imaging sphere, wherein:
the feeding tube comprises an inlet, an outlet, and an internal cavity coupling the inlet to the outlet, wherein the outlet is coupled with the inlet opening based on the vertically mounting for coupling the internal cavity with the hollow interior of the imaging sphere,
the object is placed in the inlet for dropping the object into the imaging sphere, and
the placing of the object in the inlet for the dropping of the object into the imaging sphere does not impart rotation to the object passing through the imaging sphere.

8. The apparatus of claim 1, wherein the plurality of imaging sensors comprises six imaging sensors.

9. The apparatus of claim 8, wherein:
the six imaging sensors comprise:
a first pair of imaging sensors,
a second pair of imaging sensors, and
a third pair of imaging sensors;
the first pair of imaging sensors is mounted on the imaging sphere along a first axis of the imaging sphere;
the second pair of imaging sensors is mounted on the imaging sphere along a second axis of the imaging sphere;
the third pair of imaging sensors is mounted on the imaging sphere along a third axis of the imaging sphere; and
the each of the first axis, the second axis, and the third axis are mutually perpendicular.

10. The apparatus of claim 9, wherein:
a first imaging sensor of the first pair of imaging sensors is mounted in a first direction along the first axis, and
a second imaging sensor of the first pair of imaging sensors is mounted in a second direction opposite to the first direction along the first axis;

a first imaging sensor of the second pair of imaging sensors is mounted in a first direction along the second axis, and a second imaging sensor of the second pair of imaging sensors is mounted in a second direction opposite to the first direction along the second axis;
a first imaging sensor of the third pair of imaging sensors is mounted in a first direction along the third axis, and a second imaging sensor of the third pair of imaging sensors is mounted in a second direction opposite to the first direction along the third axis.

11. The apparatus of claim 1, wherein:
the imaging sphere is orientably mounted on the frame by at least one orienting mechanism;
the imaging sphere is configured to be transitioned between a plurality of orientations for aligning a central axis of the inlet opening and the outlet opening with a force of gravity; and
the passing of the object through the imaging sphere is based on the aligning of the central axis of the inlet opening and the outlet opening with the force of gravity.

12. The apparatus of claim 11 further comprising:
at least one sensor configured for generating at least one sensor data based on detecting an alignment of the central axis of the inlet opening and the outlet opening with the force of gravity, wherein the at least one sensor is communicatively coupled with the processing device,
wherein the processing device is further configured for:
analyzing the at least one sensor data;
determining an orientation from the plurality of orientations for the imaging sphere based on the analyzing of the at least one sensor data; and
generating at least one command for transitioning the imaging sphere to the orientation based on the determining of the orientation; and
at least one actuator communicatively coupled with the processing device,
wherein the at least one actuator is operatively coupled with the at least one orienting mechanism, wherein the at least one actuator is configured for transitioning the imaging sphere to the orientation based on the at least one command.

13. The apparatus of claim 1, wherein:
the analyzing of the plurality of images comprises analyzing at least one preselected feature from a plurality of features of each of the plurality of images; and
the generating of the image is further based on the analyzing of the at least one preselected feature from the plurality of features of each of the plurality of images.

14. The apparatus of claim 1, wherein:
each of the plurality of images overlaps with at least one of the plurality of images in at least a part;
the analyzing of the plurality of images comprises masking at least one portion of at least one of the plurality of images for removing the overlapping of at least one of the plurality of images with each of the plurality of images; and
the generating of the image is further based on the masking.

15. An imaging apparatus, comprising:
a frame disposable on at least one surface;
an imaging sphere mounted on the frame, wherein the imaging sphere comprises:
a hollow interior,
an inlet opening, and
an outlet opening disposed diametrically opposite to the inlet opening, wherein an object dropped into the imaging sphere from the inlet opening exits the imaging sphere through the outlet opening by passing through the imaging sphere, wherein the passing of the object through the imaging sphere further comprises free falling through the imaging sphere;
at least one detector mounted in at least one location on the imaging sphere, wherein the at least one detector is configured for generating at least one trigger signal based on detecting a passing of the object through at least one detecting region of the imaging sphere, wherein the at least one detecting region corresponds to the at least one location;
a plurality of imaging sensors supported by the frame for mounting the plurality of imaging sensors in a plurality of locations on the imaging sphere, wherein the plurality of imaging sensors is communicatively coupled with the at least one detector, wherein the plurality of imaging sensors is configured for:
simultaneously imaging the object passing through the imaging sphere from the plurality of locations in parallel, based on the at least one trigger signal; and
simultaneously generating a plurality of images of the object passing through at least one imaging region of the imaging sphere based on the simultaneously imaging, wherein the plurality of images corresponds to a plurality of views of the object viewed from the plurality of locations;
a processing device communicatively coupled with the plurality of imaging sensors, wherein the processing device is configured for:
analyzing the plurality of images in parallel; and
generating an image of the object based on the analyzing;
a storage device communicatively coupled with the processing device, wherein the storage device is configured for storing the image; and
a feeding tube supported by the frame for vertically mounting the feeding tube on the imaging sphere, wherein:
the feeding tube comprises an inlet, an outlet, and an internal cavity coupling the inlet to the outlet,
the outlet is coupled with the inlet opening based on the vertically mounting for coupling the internal cavity with the hollow interior of the imaging sphere,
the object is placed in the inlet for dropping the object into the imaging sphere, and
the placing of the object in the inlet for the dropping of the object into the imaging sphere does not impart rotation to the object passing through the imaging sphere.

16. The apparatus of claim 15 further comprising an input device communicatively coupled with the processing device, wherein:
the input device is configured for generating a first input,
the processing device is further configured for generating a first command for the at least one detector based on the first input,
the processing device is communicatively coupled with the at least one detector, and
the generating of the at least one trigger signal includes a single signal generated based on the first command.

17. The apparatus of claim 16, wherein:
the input device is configured for generating a second input, wherein the processing device is further configured for generating a second command for the at least one detector based on the second input; and the at least one detector is further configured for generating at least one data based on detecting at least one characteristic of the object passing through the at least one detecting region of the imaging sphere and the second command.

18. The apparatus of claim 17, wherein:
the processing device is further configured for:
   analyzing the at least one data based on a trained machine learning model, and
   generating at least one value for at least one parameter associated with the plurality of imaging sensors based on the analyzing of the at least one data; and
the plurality of imaging sensors is configured for calibrating the at least one parameter of the plurality of imaging sensors based on the at least one value for the simultaneously imaging of the object in the at least one imaging region of the imaging sphere.

19. The apparatus of claim 18, wherein:
the storage device is further configured for retrieving at least one detecting region information associated with the at least one detecting region and at least one imaging region information associated with the at least one imaging region;
the processing device is further configured for analyzing the at least one detecting region information and the at least one imaging region information; and
the generating of the at least one value for the at least one parameter is further based on the analyzing of the at least one detecting region information and the at least one imaging region information.

20. A method for acquiring an image, comprising:
dropping an object into free fall;
detecting the dropping of the object;
triggering a plurality cameras to simultaneously image the object in parallel, while the object drops into a bottom half of an imaging sphere at a center of a field of view of each of the plurality of cameras, upon detecting the dropping of the object;
analyzing images of the imaged object in parallel, based on a trained machine learning model; and
displaying a three dimensional image of a surface of the object based on the analysis of the images of the imaged object.

* * * * *